(12) United States Patent
Henning

(10) Patent No.: US 6,474,718 B1
(45) Date of Patent: Nov. 5, 2002

(54) HEAP CLIMBING CONTAINER COVER SYSTEM

(75) Inventor: Steve Henning, Anderson, IN (US)

(73) Assignee: Aero Industries, Inc., Indianapolis, IN (US)

( * ) Notice: Subject to any disclaimer, the term of this patent is extended or adjusted under 35 U.S.C. 154(b) by 0 days.

(21) Appl. No.: 09/533,532

(22) Filed: Mar. 23, 2000

(51) Int. Cl.⁷ .................................................. B60P 7/04
(52) U.S. Cl. .................................................... 296/98
(58) Field of Search ............................. 296/98, 100.11, 296/100.12, 100.13, 100.14, 100.16, 100.18; 160/66, 67, 68, 71, 81

(56) References Cited

U.S. PATENT DOCUMENTS

| | | | | |
|---|---|---|---|---|
| 4,225,175 A | * | 9/1980 | Fredin | 296/98 |
| 4,842,323 A | | 6/1989 | Trickett | |
| 4,874,196 A | * | 10/1989 | Goldstein et al. | 296/98 |
| 5,002,328 A | * | 3/1991 | Michel | 296/98 |
| 5,125,713 A | | 6/1992 | Willingham et al. | |
| 5,292,169 A | * | 3/1994 | O'Brian | 296/98 |
| 5,697,663 A | | 12/1997 | Chenowth | |
| 5,806,911 A | * | 9/1998 | Haddad, Jr. | 296/98 |
| 5,823,604 A | | 10/1998 | Chenowth | |
| 5,882,062 A | | 3/1999 | Chenowth | |
| 5,944,374 A | | 8/1999 | Searfoss | |
| 6,206,449 B1 | * | 3/2001 | Searfoss | 296/98 |

* cited by examiner

Primary Examiner—Stephen T. Gordon
Assistant Examiner—Jason Morrow
(74) Attorney, Agent, or Firm—Maginot, Moore & Bowman

(57) ABSTRACT

A cover system for an open top container, such as a dump truck bed, includes a pair of pivoting load arm assemblies, one mounted on each side of the bed, configured to jointly convey a cover tarpaulin over a heaped load within the bed. In one embodiment, the load arm assembly includes a pair of telescoping arms, with a lower arm pivotably mounted to an upper rail of the dump bed. The free end of the upper arm of each assembly includes a yoke, formed by a pair of arms diverging to form a notch. The notch is configured to catch or receive a pull bar connected to a retractable tarp. The notch opening is maintained at the level of the edge of the dump bed side boards by a catch projecting generally perpendicular to the yoke. The retractable tarp is unwound from a roller at one end of the dump bed, preferably using a pull rope attached to the pull bar. As the tarp is initially unfurled, the pull bar rides on the side boards of the dump bed until it reaches the position of the load arm yokes. As the bar is pulled further, it lodges within the yokes and is conveyed along an arc defined by the pivoting load arm assemblies. The arc carries the pull bar, and consequently the tarp, above a heaped load within the dump bed. The load arm assemblies swing through their complete arc as the catch again contacts the bed side boards near the opposite end of the bed. At this point, continued movement of the pull bar extracts the bar from the yoke, eventually covering the entire dump bed.

21 Claims, 4 Drawing Sheets

HEAP CLIMBING CONTAINER COVER SYSTEM

BACKGROUND OF THE INVENTION

The present invention relates to systems for covering open-top containers. In a more specific application of the invention, a system for covering a vehicle container, such as a dump truck body, is contemplated.

Some hauling vehicles, such as dump trucks, include open-top containers used for hauling or storing various materials. For example in a typical dump truck application, the dump body is used to haul a variety of a particulate material, such as gravel, aggregate or similar materials. In addition, some hauling vehicles carry organic materials, such as grain or produce.

Depending upon the nature of the material stored within the open-top container, it is often desirable to provide a cover for the container. Of course, rigid covers are well known that may be hinged from one end of the container body. These rigid covers gradually gave way in the industry to flexible tarping systems because the flexible tarp can be easily stowed when a cover is not necessary and is much easier to manipulate than a rigid cover. A variety of tarping systems have been developed depending upon the particular hauling vehicle application. One such tarping system for use with dump trucks is the Easy Pull® tarping system of Aero Industries, Inc. The Easy Pull® system includes a flexible tarp that is wound around a spool at one end of the dump bed. A rope attached to the free end of the tarp can be used to unwind the tarpaulin from the roller to span the length of the dump bed.

Tarping systems of this type have had wide usage over a variety of hauling and industrial applications. However, one drawback of the simple tarping system becomes evident when the hauling container is overfilled with material, or the load is heaped within the container. This heaped condition occurs frequently when dirt, for instance, is hauled to or from a work site. Filling the dump bed with as much material as possible reduces the number of hauling trips that must be made, which ultimately decreases the time-to-completion and cost of the job. An overfilled dump bed can be detrimental to the tarpaulin material as the tarp is pulled across the length of the dump bed. As the tarp scrapes across the heaped load, the tarp material can be worn, or even torn, depending upon the contents of the load. In addition, this scraping action can also dislodge material from the dump bed.

The Easy Cover® tarping system of Aero Industries, Inc., has provided one answer to that problem. The Easy Cover® tarping system includes a U-shaped frame that is pivotably mounted at its ends to the base of the container body. The horizontal section of the U-shaped bar is attached to the tarp, while the free ends of the vertical elements are pivotably mounted, Thus, the Easy Cover® tarping system allows the tarp to be manually pulled in a sweeping arc over the contained load without contacting the load. The U-shaped bar has a height that is substantially greater than any anticipated heaped load contained within the dump body. While this approach solves the problem of pulling a tarp over a heaped load, it does have certain drawbacks. For instance, the U-shaped bar must be of substantial length since it must span between the ends of the dump body. In addition, the U-shaped bar is essentially an integral element of the tarp itself, which can make installation somewhat cumbersome.

As a consequence, there remains a need for a cover system for use in covering heaped loads in an open-top container that is less cumbersome and easier to install. The cover system must be able to keep the flexible cover from scraping across the heaped load.

SUMMARY OF THE INVENTION

To address these needs, the present invention contemplates a cover system for an open top container, such as a dump truck bed, that is suited for covering heaped loads within the bed. The cover system includes a pair of pivoting load arm assemblies, one mounted on each side of the bed, that are adapted for use with a retractable tarp system. In such a system, a flexible cover, such as a tarpaulin, is wound onto a roller within a tarp housing mounted at one end of the dump bed. The tarp can include a pull rope associated with a leading edge of the tarp—i.e., the edge being drawn from one end of the bed to the other. Preferably, the leading edge of the tarp is attached to a pull bar, to which the rope is then attached. The object of the cover system of the present invention, as particularly accomplished by the pivoting load arm assemblies, is to convey the tarp over a heaped load within the bed with, at most, minimal contact between the tarp/pull bar and the heaped load.

To accomplish this objective, the load arm assemblies each include a pair of telescoping arms, with a lower arm pivotably mounted to an upper rail of the dump bed. The free end of the upper arm of each assembly includes a yoke, or similar structure that is configured to catch or receive the pull bar connected to a retractable tarp as it traverses across the open top of the container or dump bed. In one specific embodiment, the yoke is formed by a pair of arms diverging to form a notch. The notch opening is supported at the level of the edge of the dump bed side boards by a catch projecting generally perpendicular to the yoke. Thus, in its initial position, each load arm assembly is positioned with the yoke facing the tarp housing and the notch situated at the upper edge of the side boards of the container bed.

The tarp can be manually unwound from the roller using a pull rope attached to the pull bar. As the tarp is initially unfurled, the pull bar rides on the side boards of the dump bed until it reaches the position of the load arm yokes. As the bar is pulled further, it lodges within the yokes and is conveyed along an arc defined by the pivoting load arm assemblies. The arc carries the pull bar, and consequently the tarp, above a heaped load within the dump bed. The load arm assemblies swing through their complete arc as the catch again contacts the bed side boards near the opposite end of the bed. At this point, continued movement of the pull bar extracts the bar from the yoke, eventually covering the entire dump bed.

In a preferred embodiment, the load arm assemblies include a pair of telescoping arms. This feature allows the length of each load arm to be adjusted, which thereby adjusts the diameter of the arc through which the tarp is conveyed by the arms. Preferably, the length of each load arm assembly is adjusted to provide adequate clearance between the tarp/pull bar and the heaped load at the zenith of the arc travel of the pivoting load arms. Also preferably, each load arm is pivotably mounted to an upper or top rail of the open top container or load bed, to thereby minimize the length of the telescoping arms needed to clear the heaped load.

Each load arm assembly can be readily installed on an existing container, such as a dump bed. In certain embodiments, a mounting bracket can be bolted to the top rail of the bed. A pivot pin can project from the bracket and through a pivot bore at the base of one of the telescoping arms. A cotter pin can hold the pivoting assembly together. The telescoping arms can be formed by one tubular shaped arm slidably mounted within another larger tubular shaped arm. A nut can be welded onto the outer arm to receive a set screw. As the set screw is threaded into the nut, it passes through the outer arm to provide a frictional clamping force against the inner arm.

The present invention further contemplates a method for conveying a retractable tarp across an open top container, especially over a heaped load within the container. The method comprises unrolling the tarp partially from its roller and conveying the leading edge of the tarp partially across the container bed. Prior to the tarp contacting the heaped load, the leading edge of the tarp is engaged by at least one pivoting arm, mounted to a side of the container bed. Preferably, two such arms are provide on opposite sides of the bed to support the tarp at its side edges.

Next, the tarp is pulled further toward an opposite end of the container bed. As the tarp is pulled, it follows the path of the pivoting arm as it swings through its travel arc. This path conveys the tarp up and over the heaped load. Once the tarp has cleared the load, it can be pulled to the end of the container bed where it can be fastened in its final position covering the open top container.

In another feature of the inventive method, the tarp leading edge can be disengaged from the pivoting arm at the end of the travel arc of the arm. Preferably, the travel arc of the arm spans the length of the heaped load, and most preferably beyond the length of the load to minimize possible contact between the tarp and the load.

It is one object of the invention to provide an apparatus for conveying a flexible cover, such as a tarp, over an open top container. A more specific object resides in features of the inventive system that allow the tarp to be conveyed over a heaped load without being dragged across the load.

One benefit of the inventive system is that it can be used with an existing retractable tarp system mounted on an existing open top container. A further benefit is realized by features of the invention that allow use of as short an arm assembly as necessary to convey the tarp over the heaped load.

A further benefit of the present cover system is that the length of the arms can be easily adjusted with the heaped load within the container bed. Other benefits and additional objects of the invention should become apparent upon consideration of the following written description taken with the accompanying drawings.

DESCRIPTION OF THE PREFERRED EMBODIMENT

Figure 1:
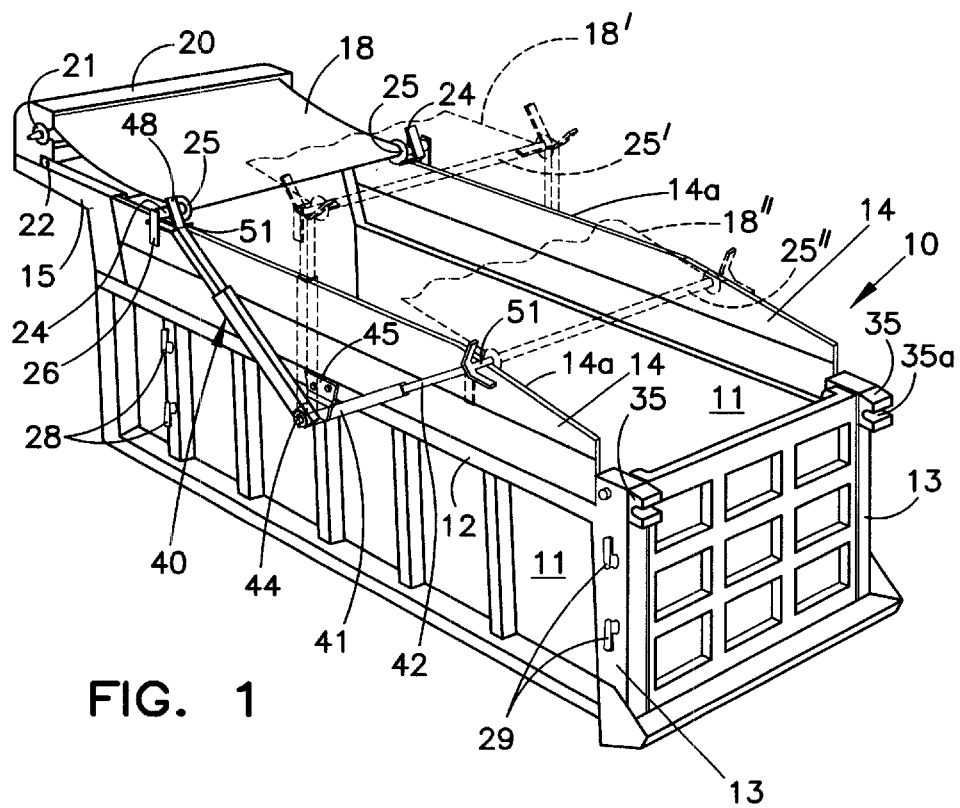
FIG. 1 is a top perspective view of an open-top container, such as the dump body of a hauling vehicle, with the cover system according to a preferred embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended. The invention includes any alterations and further modifications in the illustrated devices and described methods and further applications of the principles of the invention which would normally occur to one skilled in the art to which the invention relates.

The present invention contemplates a cover system for use in covering a heaped load in an open-top container. The invention has particular application for covering the hauling beds of special application vehicles, such as dump trucks. In one important feature of the invention, the cover system separates the tarpaulin and the pivoting arm assembly. More specifically, the pivot arm assembly is configured to catch the pull bar of the tarpaulin as the tarp is drawn across the open top of the container. As the tarp is pulled further, the pull bar lodges within the pivoting arm and the arm pivots about its axis to sweep the pull bar through an arc over the hauling bed. At the zenith of the arc, the tarp is disposed above and apart from the heaped material within the container bed. As the tarp is pulled further, the pivot arm continues in its arc directing the pull bar and the leading edge of the tarp back down toward the end of the container bed.

The cover system in accordance with a preferred embodiment of the invention is depicted in FIG. 1. The system is disposed on a container body 10, such as might be found on a dump truck. The body includes a pair of side walls 11, delimited by a horizontal top rail 12 and rear posts 13 at the end of the body. Optional side boards 14 can be mounted to the top rails 12 of the body 10 in a conventional fashion. The body can include a cab shield 15 that essentially overhangs the cab of the hauling vehicle. The dump body 10 can be of a variety of known designs, it being understood that the configuration depicted in FIG. 1 is for illustrative purposes only.

The cover system includes a flexible cover member 18 or tarpaulin. The tarp 18 can be formed of a variety of suitable materials, such as canvas or vinyl. The tarp 18 can be stowed within a tarp housing 20. More particularly, the tarp is wound around a roller 21 that is rotatably disposed within the housing 20. A pull bar 24 is connected to the tarp at its free end. The tarp 18 itself is centered on the pull bar between centering washers 25 disposed inboard from the opposite ends of the pull bar 24. A pair of lugs 26, depicted in the form of rectangular plates in FIG. 1, can extend from the free ends of the pull bar 24. The tarp housing 20 defines a stowing notch 22 into which the pull bar 24 can reside, as shown in FIG. 2, when the tarp 18 is fully wound onto the roller 21.

Figure 2:
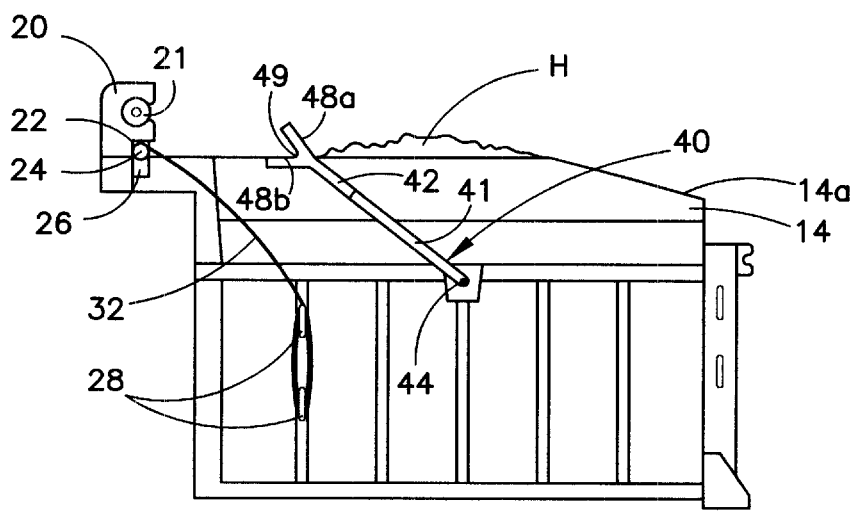
FIGS. 2–6 depict side elevational views of the dump body shown in FIG. 1, with the cover system shown at various positions in its deployment over the heaped load within the open-top container.
Figure 6:
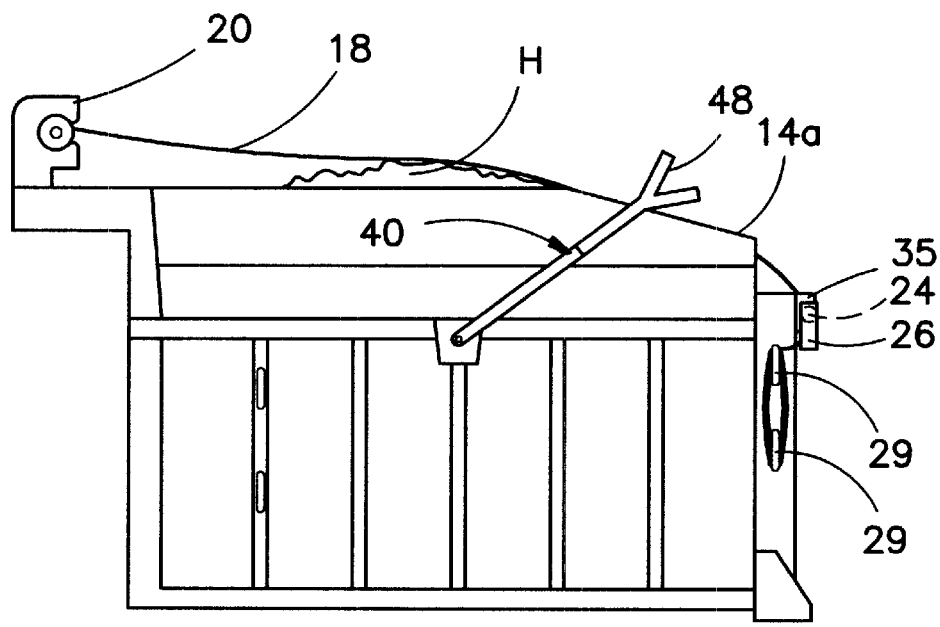

As shown in FIG. 2 a pull rope 32 can be fixed at a suitable location along the pull bar 24 or the tarp 18. When the tarp is in its stowed configuration, as depicted in FIG. 2, the pull rope 32 can be wound around forward tie down hooks 28. Similar tie down hooks 29 are provided at the rear of the dump body 10, as depicted in FIG. 1. The rear tie down hooks can be used to wind up the pull rope 32 after the tarp 18 has been unwound to its load covering position, as illustrated in FIG. 6. A pair of retainer brackets 35 can be mounted to the rear posts 13 of the dump body. The pull bar 24 can be engaged within the notches or recesses 35a (see FIG. 1) of the retainer brackets to hold the tarp in its load covering position (see FIG. 6).

As thus far described, the tarp 18, the housing 20 and roller 21 components can be of a well-known design. For instance, these components can be of the type found in the Easy Pull® tarping system sold by Aero Industries, Inc. Of course other tarping systems and arrangements are contemplated, provided that a bar, such as pull bar 24, is included at the free end of the tarp. In addition, the pull bar must have a length sufficient to extend slightly outside the side boards 14.

In accordance with the present invention, the cover system includes a load arm assembly 40 that is pivotably mounted to the side walls 11 of the dump body 10. More specifically, the load arm assembly 40 includes a pair of telescoping arms 41 and 42 configured to allow for length adjustment of the arm assembly. This length adjustment ultimately translates into an adjustment of the height that the tarp 18 reaches as it is pulled over the heaped load within the dump body. The outer or lower arm 41 is pivotably mounted to the top rail 12 by way of a pivot pin 44 and mounting bracket 45.

The inner or upper arm 42 defines a yoke 48 at its free end. The yoke itself defines a notch 49, shown best in FIG. 2, which is configured to receive the pull bar 24, as shown in FIG. 1. In the preferred embodiment, the yoke 48 is V-shaped, with the arms 48a of the yoke 48 preferably defining an angle of between 45° and 90°. The notch 49 opens sufficiently to capture the pull bar 24 as the tarp 18 is being drawn across the edge 14a of the side boards 14 (or top rails 12 if side boards are not present). The arms 48a of the yoke 48 must be sufficiently long so that the yoke 48 will engage the pull bar 24 even if it is offset slightly above the edge 14a of the side boards.

Figure 7:
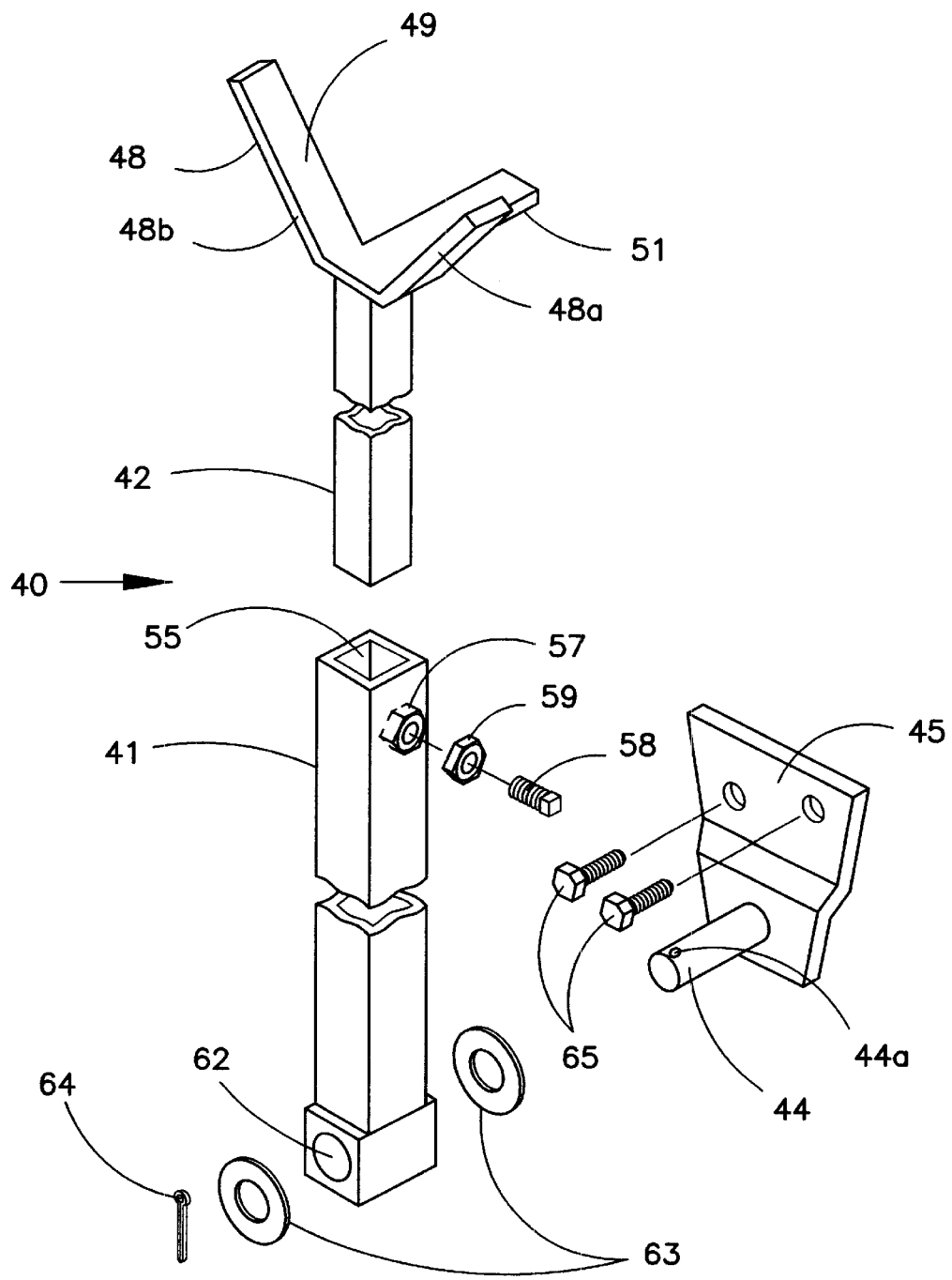
FIG. 7 is an exploded perspective view of a load arm assembly forming a component of the cover system depicted in FIG. 1.

As depicted in FIG. 1, the inner arm 42 further defines a side board catch 51 immediately adjacent the yoke 48 (as best seen in FIGS. 1 and 7). The catch 51 supports the load arm assembly 40 on the edge 14a of the side boards 14. Preferably, the catch 51 is arranged relative to the yoke 48 so that one arm 48b of the yoke is disposed at or slightly below the edge 14a of the side boards 14. As thus situated, the leg 48b of the yoke will not interfere with the passage of the pull bar 24 into the notch 49.

Figure 3:
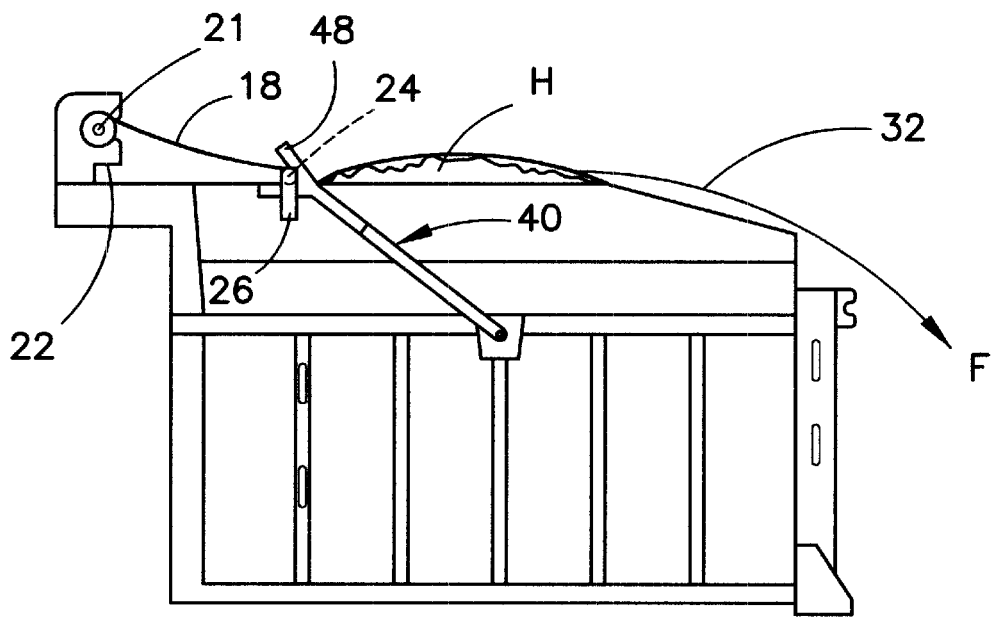

With this general description of the load arm assembly 40, the operation of the cover system of the present invention can be readily understood. The sequences of movements of this system are depicted in FIGS. 2–6. As shown in FIG. 2, the tarp 18 is initially fully wound unto the roller 21 and stowed within the tarp housing 20. The pull rope 32 can be unwound from the forward tie down hooks 28 and carried across along the dump body to the back of the dump bed, as shown in FIG. 3 . A heaped load H is depicted as it might be contained within a typical dump bed. At this point, in the use of the system, particularly with particular reference to FIG. 3, the pull rope 32 can be carried along the side of the dump body 10, and/or simply drug across the top of the heap.

As the pull rope 32 is pulled in the direction of the arrow F, it unfurls the tarp 18 from the roller 21. As the tarp unwinds it gradually travels from the front end of the dump body 10 to the rear posts 13. During the course of this travel, the pull bar 24 is intercepted by the yoke 48 of the load arm assembly 40. As depicted in FIG. 1, two such load arm assemblies are provided, one on each side of the dump body 10. Thus, the pull bar 24 is fully supported at its opposite ends within the pair of yokes 48.

Figure 4:
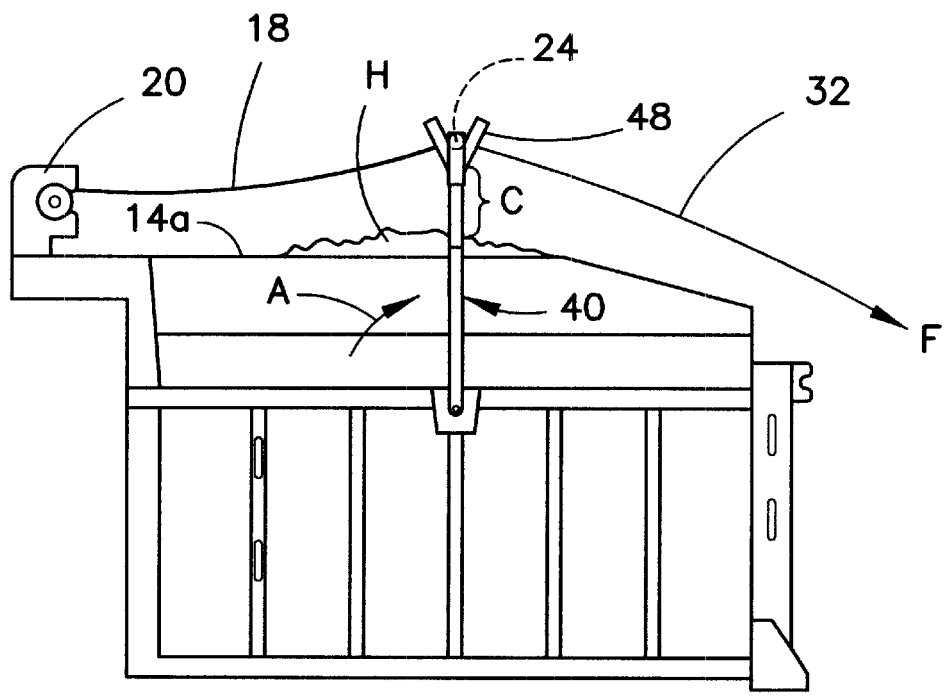

As the operator continues to pull the pull rope 32, the tarp 18 is drawn further along the length of the dump body 10. However, since the pull bar 24 of the tarp 18 is retained within the notch 49 of the load arm assembly 40, it must necessarily move along the pivoting arc A of the load arm assembly 40. Of course, since the length of the load arm assembly 40 is fixed, as is its pivot point relative to the dump body 10, the path of pull bar 24 and ultimately the tarp 18, is predetermined. When the load arm assembly 40 reaches the zenith of its travel arc, the arms 41 and 42 are vertical and the pull bar 24 is disposed a clearance distance C above the heaped material H. Thus, as depicted in FIG. 4, the tarp 18 itself is also disposed above the heaped load. With proper sizing of the length of the load arm assembly 40 relative to the anticipated height of the heaped material H, the tarp 18 will never contact the load within the dump body as it is swept along the arc A of the movement of the load arm assembly 40.

Figure 5:
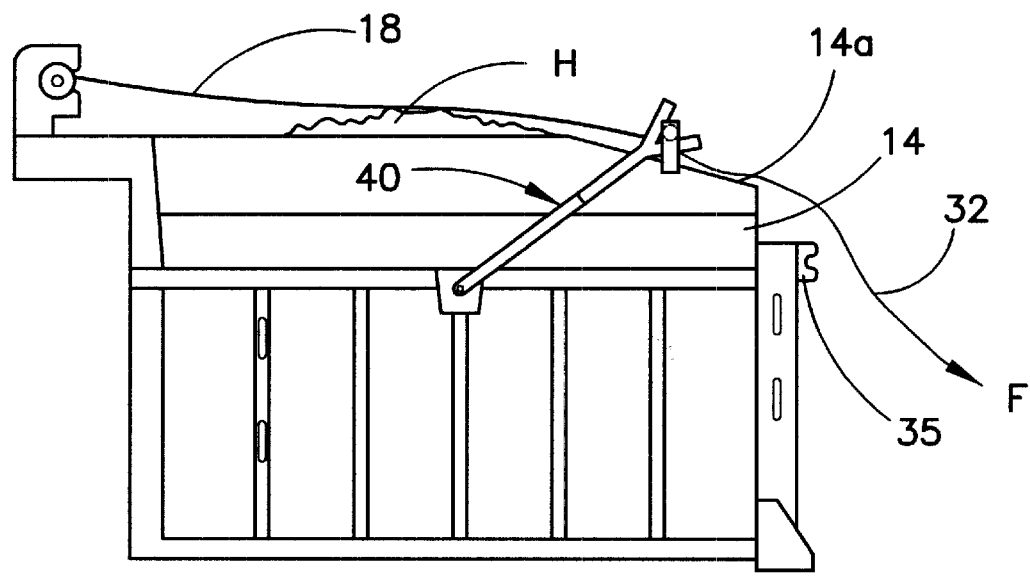

As the operator continues to pull the rope 32, the load arm assembly 40 swings to the position shown in FIG. 5. At this point, the side board catch 51 contacts the upper edge 14a of the side boards 14, thereby stopping continued movement of the load arm assembly. At this point, the tarp 18 may be disposed directly on top of the heaped material H. However, since the remaining travel distance for the tarp 18 is minimal, there should be little adverse impact as the tarp 18 is pulled across the heaped load H. As the rope is pulled further, the tarp pull bar 24 is drawn past the rear posts 13 and directly in alignment with the retainer brackets 35. At this point, the pull bar 24 can be lodged within the brackets, and the pull rope 32 can be wound around the rear tie down hooks 29. The tarp 18 is thus securely unfurled and disposed over the heaped load H as depicted in FIG. 6.

Details of one embodiment of the load arm assembly 40 can be discerned from FIG. 7. As previously described, the assembly includes an outer arm 41 and inner arm 42 that are telescopically connected. Specifically, the outer arm 41 defines a channel 55 into which the inner arm 42 is disposed. The length of the inner arm 42 can be approximately equal to the length of the outer or lower arm 41 so that the overall length of the load arm assembly 40 can be adjusted over a wide range of dimensions. In the illustrated embodiment, the lower arm 41 includes a welded nut 57 intersecting a side wall of the arm. A set screw 58 is adapted to be threaded the welded nut and through the side wall of the lower arm to contact the inner or upper arm 42 as it is disposed within the channel 55. A securing or lock nut 59 can then be threaded onto the set screw to prevent its unthreading.

The yoke 48 is formed at the free end of the inner or upper arm 42. As previously described, the yoke as defined by a pair of diverging arms 48a and 48b. The arms themselves define a notch 49 into which is received the pull bar 24. The side board catch 51 preferably projects perpendicularly outward from the yoke 48 and upper arm 42. Preferably, the catch is situated at the base of the notch 49 of the yoke 48.

Turning to the opposite end of the load arm assembly 40, the outer or lower arm 41 defines a pivot bore 62 through which the pivot pin 44 can extend. A pair of washers 63 are disposed on either side of the lower arm 41 and about the pivot pin 44. Preferably, the pivot pin 44 includes a bore 44a for receiving a cotter pin 64 to lock the pin within the pivot bore 62. The pivot pin 44 projects from the mounting bracket 45, which is preferably affixed to the dump body by way of a pair of bolts 65. Alternatively, the bracket can be welded or mounted to the side walls 11 of the dump body in a suitable fashion.

In accordance with the preferred embodiment of the invention, the load arm assembly 40 can have a much reduced length relative to prior cover systems. Preferably, the load arm assembly 40 is mounted to the top rail 12 of the dump body 10. Thus, the overall height of the load arm assembly, as established by the telescoping arms 41 and 42, can be readily ascertained. For instance, the anticipated of the heaped load H can be estimated, as can a preferred clearance C (see FIG. 1). With this clearance dimension, the overall length of the assembly can be readily calculated.

However, as a practical matter it may be preferable to adjust the length of the load arm assembly 40 on location when a material load is disposed within the dump bed. In this instance, the length of the load arm assembly 40 can be iteratively adjusted by manually pivoting the arm to its vertical position to determine whether there is sufficient clearance between the yoke 48 and the top of the heaped load H. This aspect highlights certain benefits of the present invention, namely its versatility and ease of adjustment. Since only a single arm at a time need be adjusted, changing the length of each load arm assembly 40 can be easily accomplished. The use of the set screw 58 and welded nut 57 permits infinitely variable length adjustment of the assembly 40. Alternatively, the set screw and nut can be replaced by an adjustment pin and a series of adjustment holes passing through either or both of the arms 41 and 42. With this modification, specific incremental adjustments can be made to the length of the load arm assembly 40 on either side of the dump body.

The load arm assembly 40 of the present invention also takes advantage of the physical nature of a heaped load, such as a load of particulate material. Specifically, the loaded material will rest in the form of a dome about the center of the dump body. Thus, the greatest height or clearance requirement will be at the center of the body. On the other hand, at some point the crown shape of the heaped load H falls the level of the edge 14*a* of the side boards 14. At this point there is no need for the tarp 18 to be artificially lifted above the load. Instead the tarp 18, or more particularly the pull bar 24, can simply ride along the top edge 14*a* of the side boards. Thus, the length of the telescoping arms can be shortened so that the travel arc A of the yoke 48 only encompasses the portion of the heaped load H that projects above the top edge 14*a* of the side boards 14.

With these benefits in mind, in one specific embodiment the mounting bracket 45 can be disposed at the mid-point of the side walls 11 of the dump body 10. In addition, the bracket is preferably mounted along the top rail 12 of the body. In a typical embodiment, the length of the load arm assembly 40 is adjusted so that the side board catch 51 contacts the side boards 14 at about the mid-point between the pivot pin mounting bracket 44 and the respective ends of the side walls 11.

While the invention has been illustrated and described in detail in the drawings and foregoing description, the same is to be considered as illustrative and not restrictive in character. It should be understood that only the preferred embodiments have been shown and described and that all changes and modifications that come within the spirit of the invention are desired to be protected.

What is claimed is:

1. A cover system for covering a heaped load in an open top container comprising:
    a roller disposed at one end of the open-topped container;
    a cover member, windable around the roller in a stowed position, and sized to cover the open top of the container when unwound from the roller to a deployed position, the cover member having a leading edge;
    a pulling member associated with the leading edge of said cover and manipulable to pull the leading edge across the open top of the container; and
    an elongated arm, independent of said pulling member, pivotably mounted at a first end to the container and including an element at an opposite second end configured to engage said cover member at said leading edge, said arm having a length between said first and second ends sized so that said second end is pivotable to a position above a heaped load within the container.

2. A cover system for covering a heaped load in an open top container comprising:
    a roller disposed at one end of the open-topped container;
    a cover member, windable around the roller in a stowed position, and sized to cover the open top of the container when unwound from the roller to a deployed position, the cover member having a leading edge;
    a pulling member associated with the leading edge of said cover and manipulable to pull the leading edge across the open top of the container; and
    an elongated arm, pivotably mounted at a first end to the container and including a yoke at an opposite second end forming a notch for receiving said leading edge of said cover member therein, said arm having a length between said first and second ends sized so that said second end is pivotable to a position above a heaped load within the container.

3. A cover system for covering a heaped load in an open top container having opposite end walls and opposite said walls, comprising:
    a roller disposed at one end of the open-topped container;
    a cover member, windable around the roller in a stowed position, and sized to cover the top of the container when unwound from the roller to a deployed position, the cover member having a leading edge;
    a pulling member associated with the leading edge of said cover and manipulable to pull the leading edge across the open top of the container; and
    an elongated arm, pivotably mounted at a first end to a sidewalls of the container and including an element at an opposite second end configured to engage said cover member at said leading edge, said arm having a length between said first and second ends sized so that said second end is pivotable to a position above a heaped load within the container, wherein said length of said elongated arm is less than one-half the length of the open top of the container.

4. The cover system according to claim 1, wherein said elongated arm is adjustable to vary said length between said first and second ends.

5. The cover system according to claim 2, wherein said leading edge of said cover member includes an elongated bar sized to be received within said notch.

6. The cover system according to claim 5, wherein:
    said cover member has a width substantially equal to the width of the open top of the container;
    said bar projects outside said width; and
    said elongated arm is pivotably mounted to the outside of the container.

7. The cover system according to claim 6, further comprising:
    a first elongated arm pivotably mounted to one side of the container;
    an identically configured second elongated arm pivotably mounted to the opposite side of the container; and
    said bar extending along the entire leading edge of and projecting beyond the width of said cover member to engage the notch of both said first and second elongated arms.

8. A cover system for covering a heaped load in an open top container having opposite end walls and opposite side walls, comprising:

a roller disposed at one end of the open-topped container;

a cover member, windable around the roller in a stowed position, and sized to cover the open top of the container when unwound from the roller to a deployed position, the cover member having a leading edge and a length in its deployed position that extends from said roller at the one end of the container to the opposite end of the container;

a pulling member associated with the leading edge of said cover and manipulable to pull the leading edge across the open top of the container and an elongated arm, pivotably mounted at a first end to a side wall of the container and including an element at an opposite second end configured to engage said cover member at said leading edge, said arm having a length between said first and second ends sized so that said second end is pivotable to a position above a heaped load within the container, wherein said length of said elongated arm is less than one-half the length of said cover member.

9. The cover system according to claim 8, wherein said length of said elongated arm is about one-third of the length of said cover member.

10. The cover system according to claim 1, wherein element at said second end of said elongated arm includes a catch projecting substantially perpendicularly outward from said arm for supporting said arm on an upper edge of the open top container.

11. A method for conveying a retractable tarp from a tarp housing at one end of a container, across the open top of the container, to an opposite end of the container, comprising the steps of:

conveying the leading edge of the retractable tarp partially across the open top of the container;

engaging the leading edge of the tarp to one end of a pivoting arm mounted to a side wall of the container;

conveying the leading edge of the tarp in an arc defined by the travel arc of the one end of the pivoting arm as it pivots relative to the container; and disengaging the leading edge of the tarp from the one end of the pivoting arm.

12. The method for conveying a retractable tarp according to claim 11, further comprising the step of adjusting the length of the pivoting arm to adjust the arc over which the leading edge of the tarp is conveyed.

13. The method for conveying a retractable tarp according to claim 12, in which the container contains a heaped load, wherein the step of adjusting the length of the pivoting arm includes adjusting the length so that the arc over which the leading edge of the tarp is conveyed provides a predetermined clearance over the heaped load.

14. The method for conveying a retractable tarp according to claim 11, wherein the step of disengaging the leading edge of the retractable tarp occurs over the open top of the container and the method includes the subsequent step of further conveying the leading edge of the tarp to the opposite end of the container.

15. A cover system for covering a heaped load in an open top container, comprising:

a roller disposed at one end of the open-topped container;

a cover member, windable around the roller in a stowed position, and sized to cover the open top of the container when unwound from the roller to a deployed position, the cover member having a leading edge;

a pulling member associated with the leading edge of said cover and manipulable to pull the leading edge across the open top of the container;

an elongated arm, pivotably mounted at a first end to an upper rail of the container and including an element at an opposite second end configured to releasably engage said cover member at said leading edge, said arm having a length between said first and second ends sized so that said second end is pivotable to a position above a heaped load within the container.

16. The cover system according to claim 15, wherein said element at said second end of said elongated arm is a yoke forming a notch for receiving said leading edge of said cover member therein.

17. The cover system according to claim 15, wherein said length of said elongated arm is less than one-half the length of the open top of the container.

18. The cover system according to claim 17, wherein said leading edge of said cover member includes an elongated bar sized to be received within said notch.

19. The cover system according to claim 18, wherein: said cover member has a width substantially equal to the width of the open top of the container;

said bar projects outside said width; and said elongated arm is pivotably mounted to the outside of the container.

20. The cover system according to claim 15, wherein:

said cover member has a length in its deployed position that extends from said roller at the one end of the container to the opposite end of the container; and said length of said elongated arm is less than one-half the length of said cover member.

21. The cover system according to claim 15, wherein element at said second end of said elongated arm includes a catch projecting substantially perpendicularly outward from said arm for supporting said arm on an upper edge of the open top container.

* * * * *